United States Patent [19]

Takaoka et al.

[11] 3,997,288

[45] Dec. 14, 1976

[54] HORIZONTAL-TYPE APPARATUS FOR CURING INSULATING MATERIAL

[75] Inventors: Michio Takaoka; Motoyuki Ono, both of Tokyo; Hiroto Oshima, Suzuka; Masaichiro Seki, Tokyo; Hideo Sano, Suzuka, all of Japan

[73] Assignee: The Fujikura Cable Works, Ltd., Tokyo, Japan

[22] Filed: Aug. 26, 1974

[21] Appl. No.: 500,682

[30] Foreign Application Priority Data

Aug. 30, 1973 Japan .............................. 48-97726
Nov. 26, 1973 Japan .............................. 48-133304

[52] U.S. Cl. .......................... 432/197; 165/104 M; 432/242

[51] Int. Cl.[2] .......................................... F27B 15/00

[58] Field of Search ........... 432/197, 242; 165/104, 165/107

[56] References Cited

UNITED STATES PATENTS

| | | | |
|---|---|---|---|
| 2,052,014 | 8/1936 | Chamberlain | 165/104 X |
| 3,242,973 | 3/1966 | Neale et al. | 165/104 X |
| 3,492,740 | 2/1970 | Geipel et al. | 432/197 X |
| 3,782,889 | 1/1974 | Panico | 432/59 |

*Primary Examiner*—John J. Camby
*Attorney, Agent, or Firm*—Toren, McGeady and Stanger

[57] ABSTRACT

Curable polyolefin insulating material covering an electric cable core is continuously cured as it is drawn through a horizontal curing tube constituted of a number of units each composed of heating and cooling zones and a seal portion provided to separate one unit from another, the curing tube being filled with a high-viscosity heat transfer liquid. At each seal portion, the heat transfer liquid is super-cooled and increases its viscosity enough to seal the clearance between the outer surface of the insulated cable core and the inner wall surface of the curing tube to support the cable core with the least dip. This apparatus can improve production efficiency, and the finished product is free of any eccentricity or distortion of its shape.

8 Claims, 3 Drawing Figures

HORIZONTAL-TYPE APPARATUS FOR CURING INSULATING MATERIAL

FIELD OF THE INVENTION

This invention relates to an apparatus, horizontally arranged, for continuously curing heat-curable polyolefin in the manufacture of insulated electric cables, particularly of large sizes for use as extra-high voltage transmission lines.

DESCRIPTION OF THE PRIOR ART

In the prior art, cured polyolefin-insulated electric cables are provided with a continuous covering of the curable insulating material which is carried out on an apparatus comprising an extruder and a curing tube connected together in a cascade system. This conventional device, apart from a number of advantages, is known to have the following disadvantages.

1. Since the apparatus is constituted of two parts, i.e., an extruder and a curing tube in one continuous combination, each having a different working capacity, it can not be suitably applied for the manufacture of insulated cables of varied types and sizes. In fact, the types and sizes of insulated cables to be manufactured through the apparatus are quite limited if it is intended to have the extruder and the curing tube work at their respective maximum capacities at the same time; in other words, it often occurs that the working of any one of them is below its own capacity to the accompaniment of the other.

2. Since the extruder and the curing tube are working not independently but continuously, any disorder occurring on one of them will affect the other and, therefore, operators are required to be specially skilled in the art.

3. Since the extruder and the curing tube are arranged in alignment, there is required much time for set-up.

4. If this continuous apparatus is of the vertical type, there is incurred high costs in its building, or in setting up the curing tube and the extruder in alignment.

Now, in order to overcome these disadvantages, it has been required to separate the two processing sections from each other and, in that sense, the construction of the curing tube comprising heating and cooling zones and the sealing of both ends of each zone have become important factors.

Further, where a prior art horizontal curing apparatus is applied to the treatment of a large-sized insulated cable core, the cable core being drawn through the horizontal curing tube usually bends with its own weight, or makes a great dip, possibly causing distortion of its shape or injury of its surface by contacting the inner walls of the curing tube, and only the vertical-type curing apparatus has been employed for treating a large-sized cable core. When the vertical-type apparatus is employed for the continuous manufacture of the insulated cables, it is required disadvantageously to install a large scale device for lifting the to-be-treated cable core up to the top of the apparatus and a special mechanical device at each place where the cable core should bend.

OBJECTS OF THE INVENTION

Accordingly, it is an object of the present invention to provide a horizontal-type apparatus free from the above-described disadvantages of the prior art, to perform insulator-extruding and curing processes in a separate condition.

Another object of the invention is to provide an apparatus capable of continuously curing the insulating material on a large-sized electric cable drawn in a horizontal direction with ease without the least dip.

SUMMARY OF THE INVENTION

The apparatus according to the invention comprises a curing tube constituted of a plurality of small units each composed of heating and cooling zones and a seal portion provided to separate one unit from another, such units being arranged in horizontal alignment, containing a high-viscosity heat transfer liquid as the heating or cooling medium.

As described above, the horizontal-type apparatus for the continuous curing of a polyolefin applied on a cable core must be so designed that the dip of the cable core drawn through its curing tube should be minimized. For that purpose, it may be proposed either to increase the degree of tension of the cable core or to shorten the distance between points at which the cable core is supported. However, in the proposed increase of tension degree there exist as a matter of course limitations and when the proposed shortening of the cable core-supporting distance is carried out, it will naturally become necessary to shorten the heating zone within the curing tube and, consequently, reduce the time of curing by application of elevated temperature and pressure.

The above problems inherent in the horizontal-type apparatus have now been solved by the present invention. According to the apparatus of the invention, the seal portion provided within the curing tube to separate a unit of heating and cooling zones from another is super-cooled to increase the viscosity of a heat transfer medium staying therein to such degree that the clearance between the outer surface of the passing insulated cable core and the inner wall of the curing tube becomes sealed with the cooled heat transfer medium and, at each of such seal portions, the passing insulated cable core is supported. With this sort of cable core-supporting device it is made possible to minimize the dip of the large-sized cable core drawn horizontally through each unit of the curing tube. For this purpose, according to the invention, the curing tube is constructed to have a series of several units, each composed of heating and cooling zones and separated through the seal portion, so that the curing and cooling processes can be carried out repeatedly in consecutive order.

The high-viscosity heat transfer medium to be used in the multi-stage-type curing apparatus of the present invention should be inactive to polyolefins and more critically have high viscosity-temperature coefficients. From these points of view, there is recommended silicone oil having a viscosity in a range of from about 5,000 to about 100,000 cs. as the suitable heat transfer medium.

The curing process according to the invention which is carried out under a pressurized atmosphere can prevent the unwanted formation of voids in the insulating material. Further, according to the apparatus of the invention, the total longitudinal length of the multistaged curing tube can be shortened to as small as several meters. Furthermore, it may be made feasible to improve the insulating composition by impregnating the polyolefin with silicone oil as the heat transfer medium under pressure in the course of curing, and if this is intended, it is preferred to employ two or more kinds of silicone oil having different viscosities, blended together to have a desired viscosity.

BRIEF DESCRIPTION OF THE DRAWINGS

In the accompanying drawings.

DESCRIPTION OF THE INVENTION

The present invention will be described by reference to the drawings.

Figure 1:
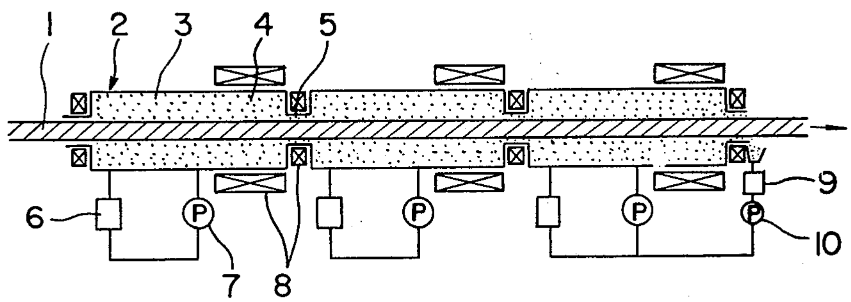
FIG. 1 shows a diagrammatic cross-sectinal view of an embodiment of the curing device in accordance with the invention.

Referring to FIG. 1, a cable core 1 which has been covered with a curable polyolefin through an extruder (not shown) is drawn into heating zone 2 of the curing tube, filled under pressure with a high-viscosity heat transfer medium 3, i.e., for example, silicone oil having a viscosity ranging from 5,000 to 100,000 cs. The heat transfer medium 3 is cooled as low as from about −20 ° to about −40° C in cooling zone 4 and seal portion 5 by means of a known cooling device 8. The clearance between the outer surface of the insulated cable core 1 and the inner wall surface of the curing tube at the seal portion 5 is adjusted to be in the order of several millimeters. This clearance will be sealed with heat transfer medium 3, to support the insulated cable core 1 withdrawn therethrough, in which case the highly viscous heat transfer medium serves as a lubricant to allow the insulator-covered cable core to travel with smoothness and without the possibility of injuring its surfaces.

The heat transfer medium used in the apparatus of the invention may be forced to circulate in the heating and cooling zones in order to improve its heat transferring efficiency to the insulated cable core. For instance, it may be heated to a temperature of from about 200° to about 250° C by means of a known heating device 6 and put under atmospheric pressure of from 6 to 20 atm by means of a pumping device 7. According to the embodiment of FIG. 1, the apparatus is provided with a curing tube which is constituted of three units arranged in alignment, each unit being composed of the curing and cooling zones and the seal portion.

Figure 2:
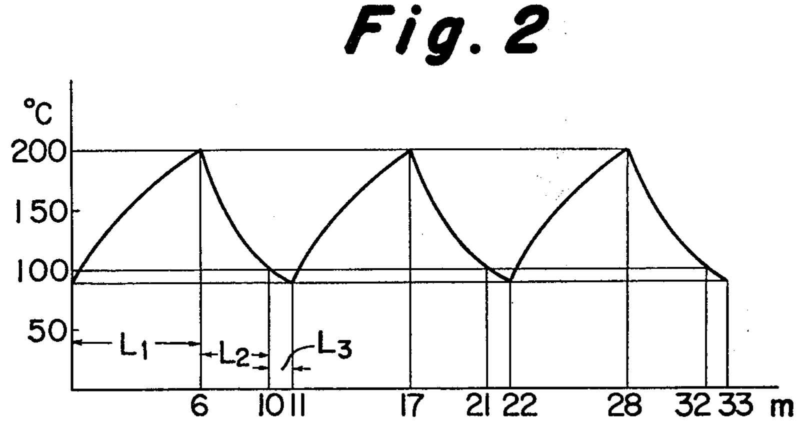
FIG. 2 shows distribution of temperatures changing during the curing process for a CV cable having a core of 275 KV and 3,000 $mm^2$, according to the embodiment of FIG. 1.

An example showing changes of temperatures at the interface between the cable core (275 KV, 3,000 $mm^2$) and the insulating material in the heating and cooling zones and the seal portion during the travelling of the insulated cable core in accordance with the embodiment of FIG. 1 is given in FIG. 2. The curve according to FIG. 2 represents three repetitions of a similar temperature change, in which symbol $L_1$ denotes the length of the cable core covered with a curable polyolefin drawn from the inlet of a first curing zone to its outlet, linearly measured 6 meters where heat-curing is performed, and symbols $L_2$ and $L_3$, respectively, denote the linear length of the same cable core farther drawn through a first cooling zone and a second seal portion to their respective outlets, measured 4 and 1 meter.

According to the above described embodiment, the curing insulation of a large-sized cable core can be carried out horizontally and easily.

Speaking of the relation of the distance between cable core-supporting points with the dip of th supported cable core drawn in a curing tube, there is given an example in which the supporting distance covering a unit composed the 6 m heating zone, 4 m cooling zone and 1 m seal portion, 11 m long in total according to the embodiment as set forth in FIGS. 1 and 2 caused the supported cable core to make a dip of about 10 cm. To contrast thereto, there is shown another example which was carried out with a single unit of curing and yet to achieve substantially the same curing result as in the embodiment with three curing units of FIG. 1 or 2. In this comparative example, the supporting distance was 20 m. and the dip of the cable core was about 40 cm. Having these examples compared, it can be determined that the dip is reduced by three quarters by lengthening the curing tube by 1.5 times and providing two supporting points between the two supporting ends, such supporting points being equally apart.

A part from the above embodiment especially useful for the curing insulation of a large-sized cable core, a suitable embodiment for a small-sized cable core may be furnished by providing curing units, each unit comprising two or more of the heating zones directly connected together and a set of two or more of the cooling zones added thereto, to make a single, longer span.

Thus, each part of the curing tube can be functionally utilized according to the sizes of cables to be produced.

Any amounts of the heat transfer liquid leaking out from the seal portion provided at the outlet of the curing tube are collected in a receptacle, and the thus recovered liquid is heated to room temperature by means of heating device 9 and then returned to the preceding heating zone for re-use by means of pump 10.

A similar means comprising a receptacle, a heating device and a pump, for re-use of any heat transfer liquid leaking out from the seal portion situated at the entrance of the curing tube may be provided so as to be associated with that seal portion.

Figure 3:
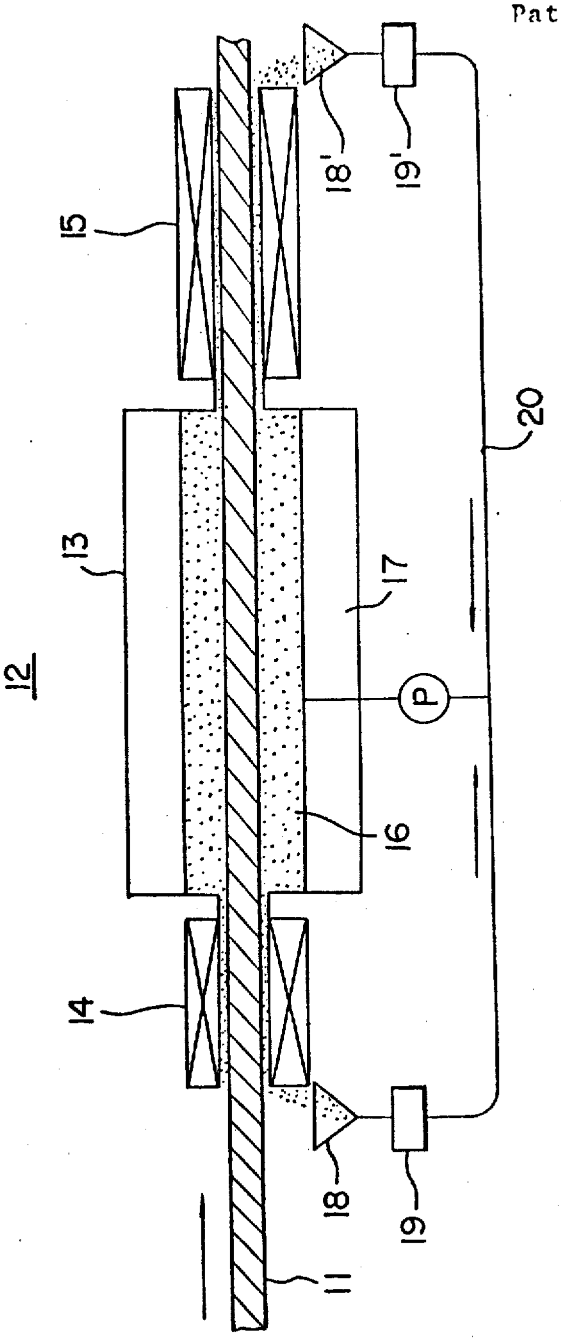
FIG. 3 is a schematic view showing another embodiment of the curing device in accordance with the invention.

Now, referring to FIG. 3, in which the cooling zone serves also as a seal portion, cable core 11 is drawn in the direction of the arrow into a horizontal-type, pressurized curing tube 12. A unit of curing tube 12 is composed of curing zone 13 situated between cooling zones 14 and 15. Curing zone 13 is filled under pressure with a high-viscosity heat transfer medium 16, kept at about 200° C by means of a heating device 17. Heating device 17 may be equipped with an ultrasonic wave transmitting device which is useful for accelerating the curing reaction. Cable core 11, having passed through cooling zone 14 which has not been cooled but kept at room temperature, comes into contact with the heat transfer liquid 16 heated to about 200° C. Then, the cooling zones 14 and 15 are super-cooled to a temperature of from −20° to −40° C under the atmospheric pressure of from 30 to 50 atm. so that the curing of a curable insulating composition will be accelerated. At the same time, the super-cooled heat transfer medium becomes to increase its viscosity enough to seal the clearance between the outer surface of the passing insulated cable core and the inner wall of the curing tube over the cooling zone.

Any amounts of the super-cooled heat trasfer liquid leaking out of cooling zones 14 or 15 are collected in a receptacle, and the thus collected liquid is heated to room temperature by means of a heating device 19 and then returned to curing zone 13 by means of a pressure pump P in the direction of the arrow by way of line 20.

The above-described apparatus according to the present invention has made it possible to solve the various problems arising from the performance of the conventional horizontal-type curing device and, in particular, reduce the curing period of time due to the application of high temperature and pressure, use a reduced tension or drawing power due to short units of the curing tube, and consequently prevent any eccentricity or distortion of the shape of the finish product. Besides, according to this apparatus, it is made possible to greatly increase production efficiency by employing a simple and not complicated mechanism for the cooling and sealing purposes.

What is claimed is:

1. Apparatus for curing curable polyolefin-insulation applied about an electrical cable core by passing said insulated core in a horizontal direction through said apparatus, said apparatus comprising a curing tube extending in a generally horizontal direction, means defining along said tube a plurality of curing units, each of said units being defined to include a heating zone, a cooling zone and a seal portion arranged in series, heating means located at said heating zone, cooling means located proximate said cooling zone and said seal portion, and a high-viscosity heat exchange medium provided within said curing tube to enable curing of said polyolefin-insulation at said heating zone by heat transfer therethrough between said heating means and said insulation as said insulated cable core is continuously passed horizontally along said apparatus sequentially through each of said curing units, said high viscosity heat exchange medium being selected to exhibit a viscosity at said seal portion sufficiently high to produce a supporting effect upon said insulated cable core as it is passed through said apparatus as a result of cooling of said heat exchange medium by said cooling means at said cooling zone.

2. Apparatus according to claim 1 wherein all of said heating zones in said curing tube comprise a total linear length sufficient to cure sai polyolefin-insulation when said electric cable core is passed through the entire length thereof.

3. Apparatus according to claim 1 wherein said heating means operate to heat said heat exchange medium to temperatures of from between about 200° to 250° C.

4. Apparatus according to claim 1 wherein said cooling means operate to cool said heat exchange medium to between about −20° to −40° C.

5. Apparatus according to claim 1 wherein said cooling means operate to cool said heat exchange medium to −40° C at said seal portion.

6. Apparatus according to claim 1 including means for circulating said heat exchange medium through said curing tube and through said heating zone and said cooling zone thereof.

7. Apparatus according to claim 1 wherein said heat exchange medium is a silicone fluid having a viscosity of from between about 5,000 to 100,000 cs.

8. Apparatus according to claim 1 wherein said cooling zone and said seal portion are formed by identical parts of said apparatus as a unified part thereof.

* * * * *

UNITED STATES PATENT OFFICE
CERTIFICATE OF CORRECTION

Patent No. 3997288 Dated December 14, 1976

Inventor(s) Michio Takaoka et al

It is certified that error appears in the above-identified patent and that said Letters Patent are hereby corrected as shown below:

-- Fig. 3 of the drawing as attached hereto belongs to the patent.--

Signed and Sealed this

Twenty-second Day of March 1977

[SEAL]

*Attest:*

RUTH C. MASON
*Attesting Officer*

C. MARSHALL DANN
*Commissioner of Patents and Trademarks*